United States Patent
Uchiyama et al.

(10) Patent No.: US 10,393,053 B2
(45) Date of Patent: Aug. 27, 2019

(54) FUEL INJECTOR OF INTERNAL COMBUSTION ENGINE AND FUEL INJECTION METHOD THEREOF

(71) Applicants: Tomoyuki Uchiyama, Nisshin (JP); Hiromitsu Seo, Toyota (JP); Tomohiko Satomi, Nagoya (JP); Takuya Takei, Toyota (JP); Masaya Murata, Nisshin (JP)

(72) Inventors: Tomoyuki Uchiyama, Nisshin (JP); Hiromitsu Seo, Toyota (JP); Tomohiko Satomi, Nagoya (JP); Takuya Takei, Toyota (JP); Masaya Murata, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 114 days.

(21) Appl. No.: 14/893,331

(22) PCT Filed: May 21, 2014

(86) PCT No.: PCT/IB2014/000801
§ 371 (c)(1),
(2) Date: Nov. 23, 2015

(87) PCT Pub. No.: WO2014/188260
PCT Pub. Date: Nov. 27, 2014

(65) Prior Publication Data
US 2016/0115894 A1      Apr. 28, 2016

(30) Foreign Application Priority Data

May 23, 2013   (JP) ................................. 2013-109070

(51) Int. Cl.
*F02D 41/30*      (2006.01)
*F02D 41/12*      (2006.01)
(Continued)

(52) U.S. Cl.
CPC ....... *F02D 41/3005* (2013.01); *F02D 41/123* (2013.01); *F02M 53/06* (2013.01);
(Continued)

(58) Field of Classification Search
CPC ............... F02D 41/3005; F02D 41/123; F02D 2200/0606; F02D 19/088; F02D 19/061;
(Continued)

(56) References Cited

U.S. PATENT DOCUMENTS 4,667,645 A * 5/1987 Gluckman ........... F02M 31/042
                                                              123/179.14
4,870,943 A * 10/1989 Bradley .................. F02C 7/224
                                                                 123/472
(Continued)

FOREIGN PATENT DOCUMENTS

JP     2002-147295 A     5/2002
JP     2009-191649 A     8/2009
(Continued)

OTHER PUBLICATIONS

International Search Report dated Sep. 16, 2014 in PCT/IB14/000801 Filed May 21, 2014.

*Primary Examiner* — Hung Q Nguyen
*Assistant Examiner* — Brian P Monahon
(74) *Attorney, Agent, or Firm* — Oblon, McClelland, Maier & Neustadt, L.L.P.

(57) ABSTRACT

A fuel injector for an internal combustion engine includes a fuel injection valve, a heater, and a controller. The fuel injection valve is configured to supply fuel to the internal combustion engine. The heater is configured to heat the fuel in the fuel injection valve. The controller is configured to: control the fuel injection valve to stop supplying the fuel to the internal combustion engine, control the heater to execute or stop heating the fuel in the fuel injection valve, and (Continued)

control the fuel injection valve to prohibit the stop of supplying the fuel during execution of the heating by the heater.

6 Claims, 5 Drawing Sheets

(51) Int. Cl.
  *F02D 19/06* (2006.01)
  *F02D 19/08* (2006.01)
  *F02M 53/06* (2006.01)
  *F02M 69/04* (2006.01)
  *F02M 31/125* (2006.01)

(52) U.S. Cl.
  CPC ......... *F02M 69/042* (2013.01); *F02D 19/061* (2013.01); *F02D 19/084* (2013.01); *F02D 19/088* (2013.01); *F02D 2200/0606* (2013.01); *F02M 31/125* (2013.01); *F02M 2700/077* (2013.01); *Y02T 10/36* (2013.01)

(58) Field of Classification Search
  CPC .... F02D 19/084; F02M 53/06; F02M 69/042; F02M 2700/077; F02M 31/125; Y02T 10/36
  See application file for complete search history.

(56) References Cited

U.S. PATENT DOCUMENTS

| | | | | |
|---|---|---|---|---|
| 5,218,943 | A * | 6/1993 | Takeda | F02D 7/02 123/531 |
| 2002/0139871 | A1* | 10/2002 | Hokao | F02M 51/0682 239/585.1 |
| 2002/0139872 | A1* | 10/2002 | Hokao | F02M 53/06 239/585.1 |
| 2004/0016416 | A1* | 1/2004 | Ichihara | F02D 9/02 123/302 |
| 2004/0074465 | A1* | 4/2004 | Hunt | F02D 41/064 123/179.15 |
| 2005/0252491 | A1* | 11/2005 | Oono | F02B 17/005 123/447 |
| 2008/0127940 | A1* | 6/2008 | Stephan | F02M 53/06 123/445 |
| 2009/0178651 | A1* | 7/2009 | Gale | F02D 41/0025 123/472 |
| 2009/0314260 | A1* | 12/2009 | Maeda | F02D 19/0605 123/491 |
| 2011/0276252 | A1* | 11/2011 | Kabasin | F02M 53/06 701/103 |
| 2011/0315121 | A1* | 12/2011 | Suzuki | F02M 37/0052 123/458 |
| 2012/0227711 | A1* | 9/2012 | Saito | F02M 55/04 123/506 |
| 2013/0118447 | A1* | 5/2013 | Martin | F02B 23/104 123/298 |
| 2014/0182562 | A1* | 7/2014 | Kim | F02M 31/125 123/557 |
| 2014/0346041 | A1* | 11/2014 | Nishijima | G01N 27/4067 204/408 |

FOREIGN PATENT DOCUMENTS

| | | | |
|---|---|---|---|
| JP | 2009180130 | A * | 8/2009 |
| JP | 2009191649 | A * | 8/2009 |
| JP | 2010-203348 | A | 9/2010 |
| JP | 2010-265774 | A | 11/2010 |

* cited by examiner

FUEL INJECTOR OF INTERNAL COMBUSTION ENGINE AND FUEL INJECTION METHOD THEREOF

BACKGROUND OF THE INVENTION

1. Field of the Invention

The present invention relates to a fuel injector of an internal combustion engine that is equipped with a fuel injection valve and a heater for heating fuel in the fuel injection valve and a fuel injection method thereof.

2. Description of Related Art

Japanese Patent Application Publication No. 2002-147295 (JP 2002-147295 A) discloses a fuel injector in which fuel in a fuel injection valve is heated by a heater to raise temperature of the fuel in the fuel injection valve, and the fuel is promoted to be atomized thereby.

SUMMARY OF THE INVENTION

In a fuel injector of an internal combustion engine, fuel injection by a fuel injection valve is stopped during deceleration for improving fuel consumption. This is called as fuel cut. When the fuel cut and heating control of the injection fuel by the heater described in JP 2002-147295 A are performed in combination, there is a concern that the following problem may be caused. That is, when the fuel cut is performed, new fuel is not flowed into the fuel injection valve, and a state where the fuel stays in the fuel injection valve is generated. Then, when the fuel staying in the fuel injection valve is heated by the heater, there is a concern that temperature of the fuel excessively rises, and vapor may be generated in the fuel injection valve thereby. When the vapor is generated in the fuel injection valve like this, there is a concern that even when the fuel injection starts after returning from the fuel cut, a desired amount of the fuel may not be injected.

The present invention prevents temperature of the fuel in the fuel injection valve from excessively rising and vapor from being generated in the fuel injection valve.

A fuel injector for in internal combustion engine according to a first aspect of the present invention includes a fuel injection valve, a heater, and a controller. The fuel injection valve is configured to supply fuel to the internal combustion engine. The heater is configured to heat the fuel in the fuel injection valve. The controller is configured to: (a) control the fuel injection valve to stop supplying the fuel to the internal combustion engine, (b) control the heater to execute or stop heating the fuel in the fuel injection valve, and (c) control the fuel injection valve to prohibit the stop of supplying the fuel during execution of the heating by the heater.

According to the first aspect, when the fuel in the fuel injection valve is heated by the heater, the stop of supplying the fuel is prohibited, and new fuel flows in the fuel injection valve. Therefore, the fuel in the fuel injection valve is injected before it is excessively heated by the heater, and also overheating of the heater and the fuel injection valve due to the stop of the flow of the fuel can be suppressed. Therefore, the fuel in the fuel injection valve can be suppressed from being excessively heated and the vapor can be suppressed from being generated in the fuel injection valve.

In the fuel injector according to the first aspect of the present invention, the controller may be configured to prohibit the stop of supplying the fuel even when execution command of the stop of supplying the fuel is present during execution of heating by the heater. In the fuel injector according to the first aspect of the present invention, the controller may be configured to cancel the prohibition of the stop of supplying the fuel after the heater is turned off. In the fuel injector according to the first aspect of the present invention, the controller may be configured to cancel the prohibition of the stop of supplying the fuel when the heater is turned-off and then a predetermined period elapses.

Immediate after the end of the heat treatment, temperatures of the heater and the fuel injection valve are high. Therefore, if the prohibition of the fuel cut is canceled immediate after the end of the heat treatment and the fuel cut is executed accompanying this, there is a concern that the fuel stayed in the fuel injection valve is heated by the heater and the fuel injection valve, the temperature thereof excessively rises, and the vapor may be generated in the fuel injection valve.

In the case of the above configuration, until a predetermined period elapses after the heat treatment came to an end and the heater was turned off, the prohibition of the fuel cut is not canceled. Therefore, after the temperatures of the heater and the fuel injection valve have become sufficiently low by cooling with the fuel, the fuel cut is executed. Thus, the excessive temperature rise of the fuel in the fuel injection valve can be suppressed and the vapor can be suppressed from being generated in the fuel injection valve.

A method of injecting fuel for an internal combustion engine according to a second aspect of the present invention, the internal combustion engine includes a fuel injection valve, a heater, and a controller. The fuel injection valve is configured to supply fuel to the internal combustion engine. The heater is configured to heat the fuel in the fuel injection valve. The method includes: controlling, by the controller, to stop supplying the fuel to the internal combustion engine by the fuel injection valve; controlling, by the controller, to execute and stop heating the fuel in the fuel injection valve; and prohibiting, by the controller, to stop supplying the fuel to the internal combustion engine when the fuel is heated by the heater. According to the second aspect, the excessive temperature rise of the fuel in the fuel injection valve can be suppressed and the vapor can be suppressed from being generated in the fuel injection valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
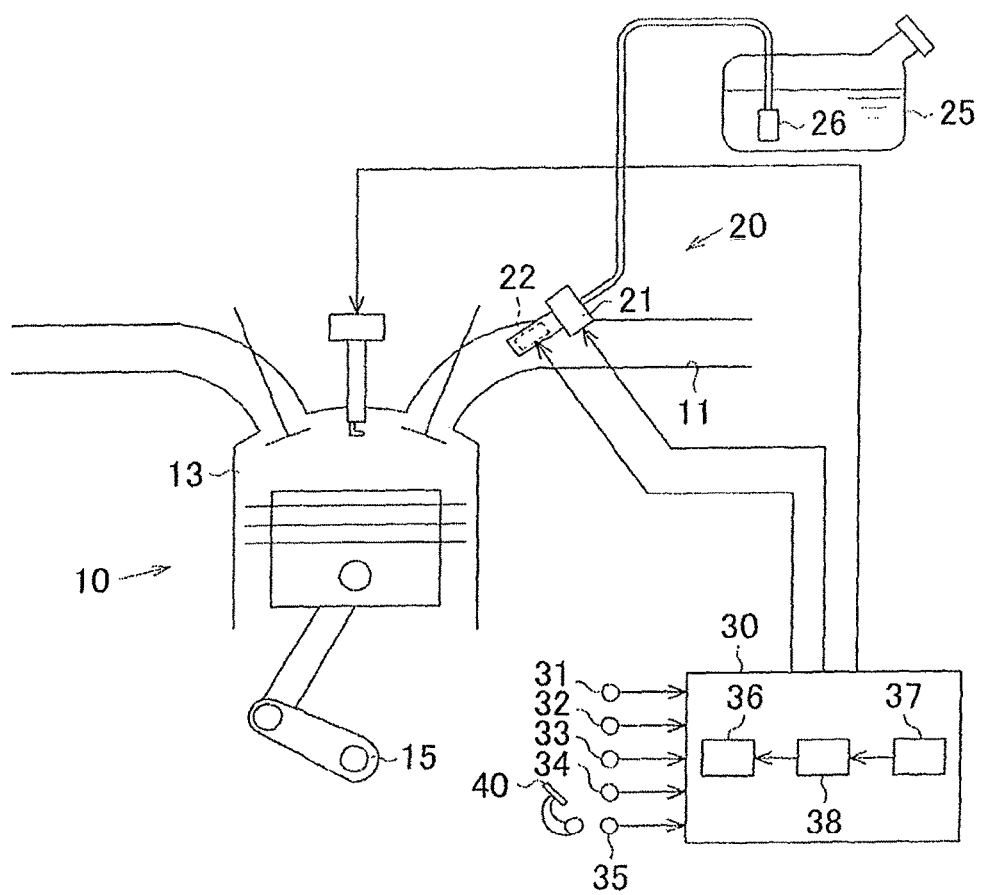
FIG. 1 is a schematic diagram that shows a fuel injector of an internal combustion engine and a peripheral structure thereof.

Hereinafter, one embodiment of a fuel injector for an internal combustion engine and a fuel injection method thereof will be described: As shown in FIG. 1, a fuel injector 20 supplies fuel by injecting to an air-intake passage 11 by a fuel injection valve 21 disposed in the air-intake passage 11 of an internal combustion engine 10. The internal combustion engine 10 can be operated only with alcohol (specifically, ethanol) or only with gasoline as a fuel, and further can be operated also with a mixed fuel obtained by mixing alcohol and gasoline at an optional ratio.

The fuel in a fuel tank 25 is sent under pressure by a fuel pump 26 to the fuel injection valve 21. Further, the fuel injection valve 21 incorporates an electric heater 22 and, when electric power is supplied to the heater 22, the fuel in the fuel injection valve 21 can be heated.

The internal combustion engine 10 is equipped with various kinds of sensors for detecting an operation state thereof. The various kinds of sensors include a rotation speed sensor 31 for detecting a rotation speed (mechanical rotation speed) of a crank shaft 15, an air flow meter 32 for detecting an amount of air (intake air amount) inhaled in a combustion chamber 13, and a water temperature sensor 33 for detecting a temperature (cooling water temperature) of cooling water of the internal combustion engine 10. The various kinds of sensors further include an air fuel ratio sensor 34 for detecting an air fuel ratio of a mixed air via an oxygen concentration of an waste, and an accelerator sensor 35 for detecting an operation amount (accelerator operation amount) of an accelerator pedal 40.

Output signals of the various kinds of sensors like these are input in a controller 30 that operates as a part of the fuel injector 20. The controller 30 executes various kinds of calculations based on the output signals of the various kinds of sensors, and executes various kinds of engine controls according to the operation of the internal combustion engine 10 based on the calculation results.

As the various kinds of the engine controls, for example, a fuel injection control for controlling the fuel injection valve 21 can be used. In the fuel injection control, firstly, a fundamental fuel injection amount for setting an air fuel ratio of a mixed air to a desired ratio (theoretical air fuel ratio, for example) is calculated based on an engine load and the engine rotation speed. The engine load is calculated based on the intake-air amount and the engine rotation speed.

Then, an air fuel ratio feedback correction factor is calculated based on a difference between an actual air fuel ratio detected by the air fuel ratio sensor 34 and a target air fuel ratio. Specifically, when the actual air fuel ratio is a ratio on a rich side than the target air fuel ratio, a specified amount is subtracted from the air fuel ratio feedback correction factor, and when the ratio is a ratio on a lean side, a specified amount is added to the air fuel ratio feedback correction factor. Learning of an air fuel ratio learning value and an alcohol concentration learning value are executed based on the air fuel ratio feedback correction factor. A steady discrepancy amount between the air fuel ratio feedback correction factor and its fundamental value (=[1.0]) is compensated by the air fuel ratio learning value and the alcohol concentration learning value. Then, in the learning treatment of the air fuel ratio leaning value, an average value of the air fuel ratio feedback correction factors during a predetermined period immediate before is calculated and a value obtained by subtracting [1.0] from the average value is added to the air fuel ratio learning value, thus, the air fuel ratio leaning value is updated.

Here, when an alcohol concentration of the fuel supplied to the internal combustion engine 10 changes, the air fuel ratio feedback correction factor changes accompanying the change of an oxygen concentration of the exhaust. Therefore, in the learning treatment, the alcohol concentration leaning value is updated in the same manner as the air fuel ratio learning value. However, the treatment of learning the alcohol concentration learning value is executed after the execution of the treatment of learning the air fuel ratio learning value over a predetermined period thereafter is prohibited on the condition that the fuel supply into the fuel tank 25 is determined to be executed. Thus, by learning the alcohol concentration learning value like this, when the fuel is supplied into the fuel tank 25, by assuming that the change of the air fuel ratio feedback correction factor thereafter follows the change of the alcohol concentration of the fuel, the alcohol concentration learning value is updated in accordance with the change of the air fuel ratio feedback correction factor. That the fuel is supplied to the fuel tank 25 can be determined by an increase in a fuel remaining amount in the fuel tank 25 detected by a remaining amount sensor and the like.

These air fuel ratio learning value and alcohol concentration learning value are added to the air fuel ratio feedback correction factor and a value of a product of the sum total thereof and the fundamental fuel injection amount is calculated as a final fuel injection amount. Then, based on the final fuel injection amount, a fuel injection period, that is, a valve opening time of the fuel injection valve 21 is calculated, and based on the fuel injection period, the fuel injection valve 21 is opened and driven. Thereby, a fuel of an amount corresponding to the final fuel injection amount is injected from the fuel injection valve 21 and supplied to the combustion chamber 13 of the internal combustion engine 10.

Further, the controller 30 executes heater control of execution or stop of heating of the fuel in the fuel injection valve 21 due to the heater 22, and fuel supply control of execution or stop of fuel supply to the internal combustion engine 10 by the fuel injection valve 21, and the fuel cut. Hereinafter, these heating control and fuel supply control will be described. These heating control and fuel supply control are repeatedly executed every predetermined period by the controller 30.

Figure 2:
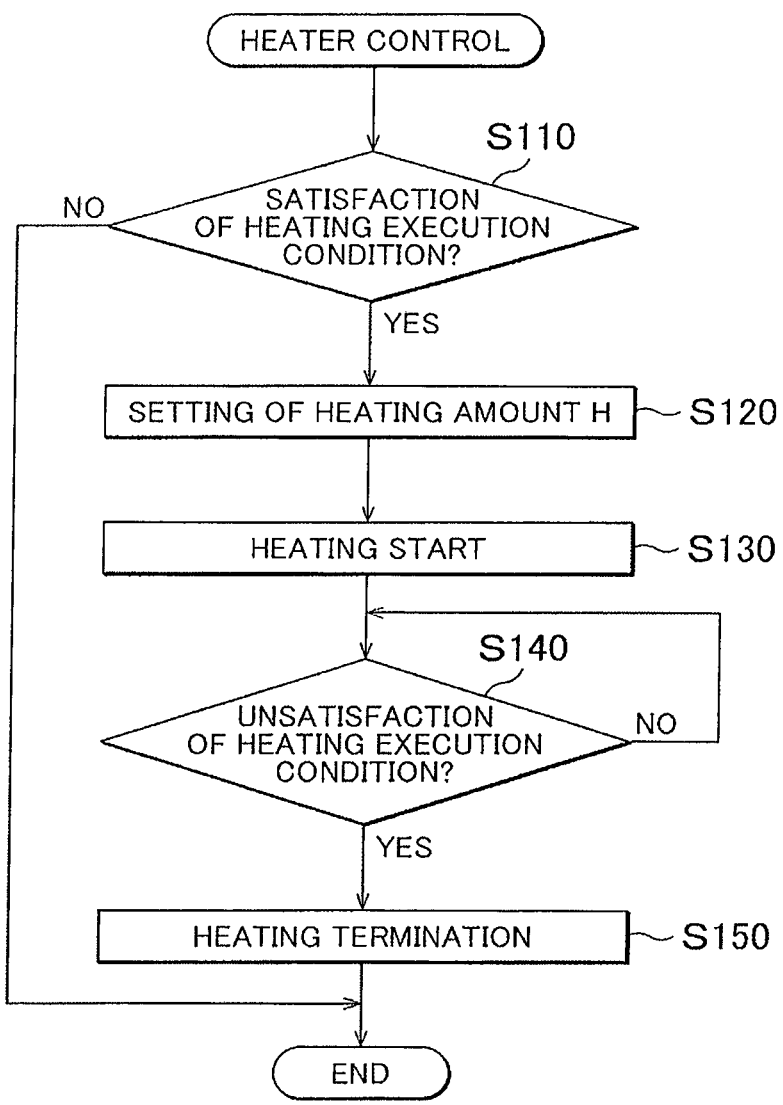
FIG. 2 is a flowchart that shows an execution procedure of a heater control.

Firstly, an execution procedure of the heater control will be described with reference to FIG. 2. As shown in FIG. 2, when the heater control is started, whether or not the heating execution condition is satisfied is determined (step S110). Here, the heating execution condition is determined to be satisfied when both of the conditions that a cooling water temperature is equal to a specified temperature or less, and the alcohol concentration learning value of the fuel is equal to a specified value or more are satisfied. When the heating execution condition is determined not to be satisfied (step 110: NO), the procedure is terminated once. On the other hand, when the heating execution condition is determined to be satisfied (step S110: YES), a heating amount H is set (step S120). Here, the heating amount H is set based on, for example, the cooling water temperature, the alcohol concentration learning value, and the final fuel injection amount. Then, when electric power corresponding to the heating amount H is supplied and the heater 22 is turned on, the heating due to the heater 22 starts (step S130). By the execution of the heating, the fuel in the fuel injection valve 21 is heated, a temperature of the injection fuel of the fuel injection valve 21 is raised, and the atomization of the fuel is promoted thereby. The execution of the heating due to the heater 22 is continuously executed until the heating execution condition becomes unsatisfied (step S140: NO). When the heating execution condition becomes unsatisfied (step S140: YES), the heating of the fuel in the fuel injection valve 21 due to the heater 22 is terminated (step S150). Thereby, the heater 22 is turned off, and the present process is terminated once. A series of treatments relating to the heater control of FIG. 2 is executed by a second controller 37 in the controller 30.

Figure 3:
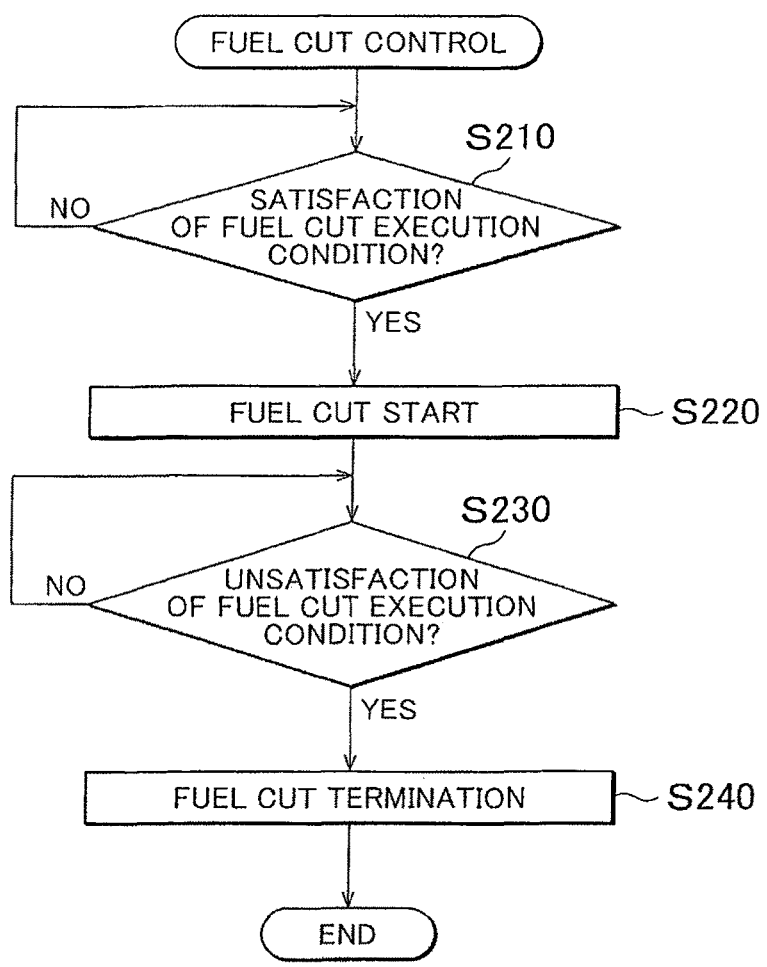
FIG. 3 is a flowchart that shows an execution procedure of a fuel cut control.

Next, the fuel supply stop control, that is, an execution procedure of the fuel cut control is described with reference to FIG. 3. As shown in FIG. 3, when the fuel cut control is started, firstly, whether or not the fuel cut execution condition is satisfied is determined (step S210). Here, the fuel cut execution condition is determined to be satisfied when both of an engine rotation speed being equal to a specified rotation speed NEp or more and a vehicle being in a deceleration state are satisfied. Whether or not the vehicle is in a deceleration state can be determined based on an accelerator operation amount, for example. While the fuel cut execution condition is determined not to be satisfied (step S210: NO), the determination of the step S210 is repeated. When the fuel cut execution condition is determined to be satisfied (step S210: YES), the execution command of the fuel cut is issued and the fuel cut is started (step S220). The execution of the fuel cut is continued until the fuel cut execution condition becomes unsatisfied (step S230: NO). When the fuel cut execution condition becomes unsatisfied (step S23: YES), the fuel cut is terminated (step S240), and the treatment is terminated once. A series of treatments relating to the fuel cut control of FIG. 3 is executed by a first controller 36 of the controller 30.

Further, the controller 30 executes fuel cut prohibition control for prohibiting the fuel cut that stops the fuel supply during execution of heating by the heater 22. Hereinafter, an execution procedure of the fuel cut prohibition control will be described with reference to FIG. 4. The fuel cut prohibition control is repeatedly executed by the controller 30 every predetermined period.

Figure 4:
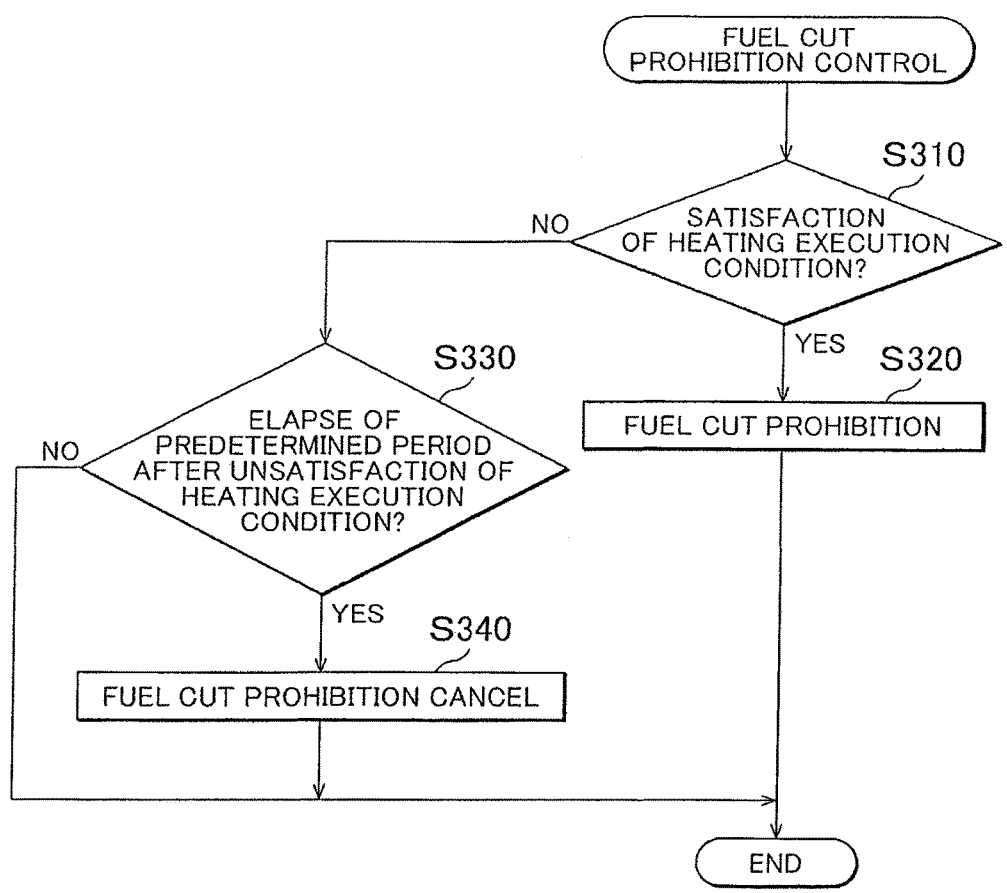
FIG. 4 is a flowchart that shows an execution procedure of a fuel cut prohibition control.
Figure 5A:
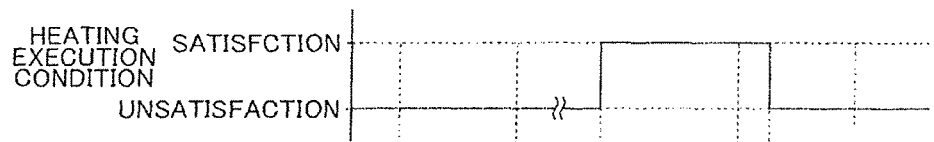
FIG. 5A is a time chart that shows a shift of heating execution condition.
Figure 5B:
FIG. 5B is a time chart that shows a shift of fuel cut execution condition.
Figure 5C:
FIG. 5C is a time chart that shows a shift of prohibition and cancel of fuel cut.
Figure 5D:
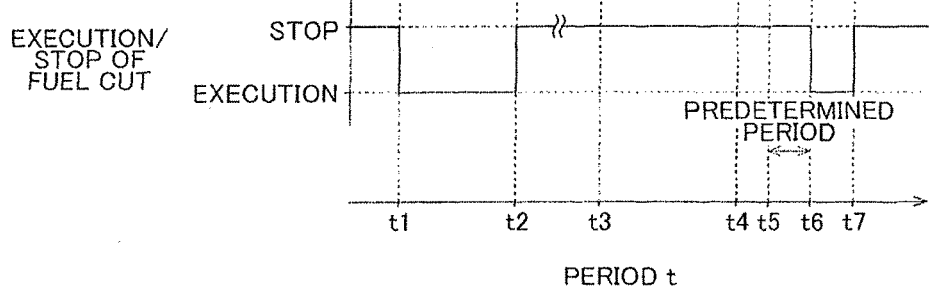
FIG. 5D is a time chart that shows a shift of execution and stop of the fuel cut.

As shown in FIG. 4, when the fuel cut prohibition control is started, firstly, whether or not the heating execution condition is satisfied is determined (step S310). The heating execution condition is the same condition as the heating execution condition determined to be satisfied in the step S110 of the heating control. That is, in the step S310, whether or not the fuel in the fuel injection valve 21 is heated by the heater 22 is determined. When the heating execution condition is determined to be satisfied (step S310: YES), the heater 22 is assumed to be executing heating by the heater 22, the fuel cut is prohibited (step S320). Thus, in the case where the fuel cut is being executed, the fuel cut execution is stopped, and in the case where the fuel cut is not executed, the execution start of the fuel cut thereafter is prohibited. That is, the fuel cut is not executed even when the fuel cut execution command is issued during execution of heating by the heater 22. The prohibition of the execution of the fuel cut like this is continuously executed while the heating execution condition is satisfied.

Then, when the heating execution condition is determined not to be satisfied (step S310: NO), it is assumed that the heating treatment has come to an end and the heater 22 is turned off, and whether or not a predetermined period has elapsed after the heating execution condition became unsatisfied is determined (step S330). The larger the heating amount H is, the higher the temperatures of the heater 22 and the fuel injection valve 21 immediate after the end of the heating treatment are. Therefore, the larger the heating amount H is, the longer the predetermined period is set. Further, the larger a final fuel injection amount, that is, an amount of the fuel injected from the fuel injection valve 21 at this moment is, the lower the temperatures of the heater 22 and the fuel injection valve 21, which are cooled by the fuel tend to be lowered. Therefore, as the final fuel injection amount increases, the predetermined period is set shorter. Then, until the predetermined period elapses after the heating execution condition became unsatisfied (step S330: NO), the temperatures of the heater 22 and the fuel injection valve 21 are assumed not to be sufficiently decreased, the present treatment is terminated as it is. On the other hand, when it is determined that the predetermined period has elapsed after the heating execution condition became unsatisfied (step S330: YES), the temperatures of the heater 22 and the fuel injection valve 21 are assumed to be sufficiently lowered, the fuel cut prohibition is canceled (step S340). Thus, when the fuel cut execution command is present at this moment, the fuel cut is executed, and when the fuel cut execution command is not present, the fuel cut execution start thereafter is permitted. Then, the present treatment is terminated once. A series of the treatments relating to the fuel cut prohibition control of FIG. 4 is executed by a third controller 38 of the controller 30.

Next, workings of the fuel injector 20 and a fuel injection method due to the fuel injector 20 will be described. As shown in FIGS. 5A, 5B, 5C, and 5D, when the fuel cut execution condition is satisfied (timing t1), if the heating execution condition is not satisfied, the fuel cut is started. The fuel cut treatment is continuously executed while the fuel cut execution condition is satisfied and the heating execution condition is not satisfied (timing t1 to t2). Then, when the fuel cut execution condition becomes unsatisfied (timing t2), the fuel cut is stopped.

On the other hand, when the heating execution condition is satisfied and the heating of the fuel in the fuel injection valve 21 due to the heater 22 is executed (timing t3), the fuel cut is prohibited. Since the fuel cut execution condition is not satisfied at this moment, a state where the fuel cut execution is stopped is maintained around the timing t3. Then, while the heating execution condition is satisfied, that is, while the heating due to the heater 22 is being executed, if the fuel cut execution condition is satisfied (timing t4), since the fuel cut execution is prohibited, the fuel cut execution remains stopped. Thereafter, when the heating execution condition becomes unsatisfied (timing t5), the heating due to the heater 22 is terminated. However, until a predetermined period elapses after the heating execution condition has become unsatisfied, the fuel cut execution prohibition is maintained as it is. Next, when it is determined that a predetermined period has elapsed after the non-satisfaction of the heating execution condition, the fuel cut prohibition is canceled and permitted (timing t6). At this moment of the timing t6, since the fuel cut execution condition is satisfied, the fuel cut is started accompanying this. Then, the fuel cut is continuously executed while the fuel cut execution condition is satisfied and the heating execution condition is not satisfied. Thereafter, when the fuel cut execution condition becomes unsatisfied (timing t7), the execution of the fuel cut is stopped.

According to the fuel injector 20 and fuel injection method described above, the following effects can be obtained. (1) When the fuel in the fuel injection valve 21 is heated by the heater 22 through the heating treatment, execution of the fuel cut is prohibited, and a new fuel flows in the fuel injection valve 21. Therefore, the fuel in the fuel injection valve 21 is injected before the excessive temperature rise, and temperatures of the heater 22 and fuel injection valve 21 can be suppressed from being excessively elevated due to the stop of the flow of the fuel. Therefore, the excessive temperature rise of the fuel in the fuel injection valve 21 can be suppressed and the vapor can be suppressed from being generated in the fuel injection valve 21.

(2) Immediate after the end of the heat treatment, the temperatures of the heater 22 and fuel injection valve 21 are high. Therefore, if the prohibition of the fuel cut is canceled immediate after the end of the heat treatment and the fuel cut is executed accompanying this, there is a concern that the fuel stayed in the fuel injection valve 21 is heated by heat of the heater 22 and the fuel injection valve 21 and the temperature thereof is excessively elevated, and the vapor may be generated in the fuel injection valve 21. According to the fuel injector 20 described above, until a predetermined period elapses after the heat treatment was terminated and the heater 22 was turned off, the prohibition of the fuel cut is not canceled. Accordingly, the fuel cut is performed after the temperatures of the heater 22 and fuel injection valve 21 became sufficiently low due to cooling by the fuel. Thus, the excessive temperature rise of the fuel in the fuel injection valve 21 can be suppressed and the vapor can be suppressed from being generated in the fuel injection valve 21.

The embodiment described above can be performed by changing as shown below. Further, the embodiment described above and a modification example below can appropriately be combined and performed. The heating amount H may be set to a predetermined constant amount by eliminating the step S120 in FIG. 2.

The predetermined period used in the step S330 of FIG. 4 may be set to a predetermined constant period. When the predetermined period is set to a constant period, the predetermined period is set to a sufficiently long period such that the temperatures of the heater 22 and fuel injection valve 21 become sufficiently low during a period from a moment of the end of the heating due to the heater 22 to an elapse of the predetermined period.

The prohibition of the execution of the fuel cut may be canceled immediate after the end of the heat treatment by the heater 22. That is, in the fuel cut prohibition control of FIG. 4, when the step S330 is omitted and the heating execution condition became unsatisfied (step S310: NO), the prohibition of the fuel cut may be canceled (step S340). Further, whether or not the prohibition of the fuel cut is canceled may be determined on a case by case basis based on the heating amount H and the final fuel injection amount. Also according to the mode like this, the vapor can be suppressed from being generated in the fuel injection valve 21 during heating of the fuel in the fuel injection valve 21 due to the heater 22.

As the fuel injection valve 21, a fuel injection valve that is provided to a cylinder of the internal combustion engine 10 and directly injects and supplies the fuel in the combustion chamber 13 can be used. As the internal combustion engine 10, any of an engine that allows only a drive that uses alcohol as the fuel, an engine that allows only a drive that uses a mixed fuel obtained by mixing alcohol and gasoline, and an engine that allows only a drive that uses gasoline as the fuel can be used. In the case of the internal combustion engine 10 that uses gasoline as the fuel, the updating of the alcohol concentration learning value is omitted and, in the parameter relating to the setting of the heating execution condition and the heating amount H in the heating control of FIG. 2, the alcohol concentration learning value is omitted.

The invention claimed is:

1. A fuel injector for an internal combustion engine, the fuel injector comprising:
    a fuel injection valve configured to supply fuel to the internal combustion engine;
    a heater configured to heat the fuel in the fuel injection valve; and
    a controller programmed to:
    (a) control the fuel injection valve to stop supplying the fuel to the internal combustion engine when a fuel cut execution condition is determined to be satisfied;
    (b) control the heater to execute heating the fuel in the fuel injection valve when a heating execution condition is determined to be satisfied, and control the heater to stop heating the fuel in the fuel injection valve when the heating execution condition is determined not to be satisfied; and
    (c) control the fuel injection valve to prohibit the stop of supplying the fuel during execution of the heating by the heater when the heating execution condition is determined to be satisfied,
    wherein the controller is programmed to prohibit the stop of supplying the fuel when the heating execution condition is determined to be satisfied and the fuel cut execution condition is determined to be satisfied, and
    wherein the controller is programmed to cancel the prohibition of the stop of supplying the fuel when the heating execution is determined not to be satisfied and the heater has been turned off for a predetermined period of time for suppressing excessive temperature rise of the fuel in the fuel injection valve.

2. A method of injecting fuel for an internal combustion engine, the internal combustion engine including a fuel injection valve configured to supply the fuel to the internal combustion engine, a heater configured to heat the fuel in the fuel injection valve, and a controller, the method comprising:
    determining if a fuel cut condition is satisfied;
    controlling, by the controller, to stop supplying the fuel to the internal combustion engine by the fuel injection valve when the fuel cut execution condition is determined to be satisfied;
    determining if a heating execution condition is satisfied;
    controlling, by the controller, to execute heating the fuel in the fuel injection valve when the heating execution condition is determined to be satisfied
    controlling, by the controller, to stop heating the fuel in the fuel injection valve when the heating execution condition is determined not to be satisfied;
    prohibiting, by the controller, to stop supplying the fuel to the internal combustion engine when the fuel is heated by the heater when the heating execution condition is determined to be satisfied,
    prohibiting the stop of supplying the fuel when the heating execution condition is determined to be satisfied and the fuel cut execution condition is determined to be satisfied; and
    canceling the prohibiting of the stop of supplying the fuel when the heating execution is determined not to be satisfied and the heater has been turned off for a predetermined period of time for suppressing excessive temperature rise of the fuel in the fuel injection valve.

3. The fuel injector according to claim 1, wherein the heating execution condition is determined to be satisfied when a cooling water temperature is less than or equal to a predetermined temperature, and an alcohol concentration learning value of the fuel is greater than or equal to a predetermined value.

4. The fuel injector according to claim 1, wherein the fuel cut condition is determined to be satisfied when an engine rotation speed is greater than or equal to a predetermined rotation speed, and a vehicle including the internal combustion engine is in a deceleration state.

5. The method according to claim 2, wherein the heating execution condition is determined to be satisfied when a cooling water temperature is less than or equal to a predetermined temperature, and an alcohol concentration learning value of the fuel is greater than or equal to a predetermined value.

6. The method according to claim 2, wherein the fuel cut condition is determined to be satisfied when an engine rotation speed is greater than or equal to a predetermined rotation speed, and a vehicle including the internal combustion engine is in a deceleration state.

* * * * *